United States Patent [19]

Castleman

[11] 4,210,419
[45] Jul. 1, 1980

[54] AUTOMATED QUANTITATIVE MUSCLE BIOPSY ANALYSIS SYSTEM

[75] Inventor: Kenneth R. Castleman, Glendale, Calif.

[73] Assignee: California Institute of Technology, Pasadena, Calif.

[21] Appl. No.: 878,731

[22] Filed: Feb. 17, 1978

[51] Int. Cl.² ............................................. G01N 33/16
[52] U.S. Cl. ................................... 23/230 B; 364/413; 364/415; 422/57; 422/67
[58] Field of Search .................. 422/67, 57; 23/230 B; 128/2 G; 364/413, 415; 356/158, 36

[56] References Cited
U.S. PATENT DOCUMENTS 3,919,530  11/1975  Cheng ................................. 23/230 B

OTHER PUBLICATIONS

Castleman et al., "Quantitative Muscle Biopsy Analysis", Soc. of Photooptical Instrum. Engs., vol. 89 Applications of Optics in Medicine and Biology (1976) 1977.

Primary Examiner—R. E. Serwin
Attorney, Agent, or Firm—Freilich, Hornbaker, Wasserman, Rosen & Fernandez

[57] ABSTRACT

An automated system to aid the diagnosis of neuromuscular diseases by producing fiber size histograms utilizing histochemically stained muscle biopsy tissue. Televised images of the microscopic fibers are processed electronically by a multi-microprocessor computer, which isolates, measures, and classifies the fibers and displays the fiber size distribution. The architecture of the multi-microprocessor computer, which is iterated to any required degree of complexity, features a series of individual microprocessors $P_n$ each receiving data from a shared memory $M_{n-1}$ and outputing processed data to a separate shared memory $M_{n+1}$ under control of a program stored in dedicated memory $M_n$.

10 Claims, 10 Drawing Figures

AUTOMATED QUANTITATIVE MUSCLE BIOPSY ANALYSIS SYSTEM

ORIGIN OF THE INVENTION

The invention described herein was made in the performance of work under a NASA contract and is subject to the provisions of Section 305 of the National Aeronautics and Space Act of 1958. Public Law 85-568 (72 Stat. 435, 42 U.S.C. Sec. 2457).

BACKGROUND OF THE INVENTION

This invention relates to an automated system for quantitative biopsy analysis of muscle tissue.

Research studies into muscular dysfunction and, in particular, the clinical diagnosis of neuromuscular diseases frequently require a biopsy analysis for the classification and characterization of muscle tissue. By analyzing such characteristics as the size, texture or density of the muscle fibers, neurologists can use the information to more accurately diagnose both the type and severity of each disease. One tool to aid in that effort has been found using the science of histochemistry, wherein the chemical constitution and microscopic anatomy of living cells and tissue are studied on stained microscope slides. While enzyme histochemical methods have been implemented only in the past decade, the techniques have proved to play an essential and significant role in both research and clinical medicine during that relatively short time.

By producing specimens in a manner such that the various types of muscle fibers are distinguishable by color, a quantitative analysis of the muscle tissue may be accomplished. In a normal human being, one would observe that the numbers of each type of muscle fiber are roughly equal and the fiber diameter distributed about a mean value. Although the average fiber diameter in males is usually larger than in females, the sizes of individual fiber diameters typically average approximately fifty microns. It is both the muscular fiber size and the relative proportion of each type of the roughly polygonal fiber shapes which are primarily affected and altered by various neuromuscular diseases. For example, muscular atrophy reduces the mean fiber diameter while, on the other hand, certain diseases produce a disproportionate number of one type of fibers. A record of these abnormal changes can be maintained by a fiber diameter histogram taken for each muscle fiber type. Although use of the histogram in this manner has been shown to be a valuable tool both in the diagnosis of neuromuscular disease and for the research study of the progression of degenerative muscle diseases, the prior art methods of generating the histograms have been painstakingly tedious and unfortunately fraught with human errors. The reasons for this can be found in the approach applied by the prior art, which was subjective in its methodology. In essence, the fiber diameter and the relative proportion of the fiber types to each other were judged visually by the human eye to be either normal or abnormal while, at the same time, the quantitative information available from the specimen was virtually ignored. In other instances, the fiber diameters would be measured by hand on photomicrographs and then fiber diameter histograms were plotted manually from the measurements.

SUMMARY OF THE INVENTION

In accordance with the present invention, an automated computerized system performs a quantitative scientific analysis of the sizes and relative numbers of the muscle fibers in a muscle biopsy specimen. A microscope slide containing muscle biopsy tissue is stained by commonly used techniques to produce a specimen wherein the different types of muscle fibers are distinguishable by color. The slides are first placed under a microscope which has an attached television camera. The video signal of the magnified image from the camera is then converted into digital form to be processed by a multi-microprocessor computer specially designed for clinical laboratory instrumentation. The computer employs a sequential programmed, step-oriented pipeline architecture which accommodates most of the analytical procedures for biomedical research studies. The individual muscle fibers are isolated and measured, and then classified by their staining intensity. A fiber-size histogram of the specimen is plotted for each type of muscle fiber. The architecture of the multi-microprocessor computer is based on the use of modular components iterated or cascaded to any degree of complexity required for the analytical procedures. A basic module comprises a microprocessor, a first read-write memory used for data storage, and a second read-only or read-write memory containing stored program instructions for execution by the microprocessor. When iteration is required, the first read-write memory of each subsequent iteration accepts as its input data the output data of the last iteration. The memories and microprocessors are connected in cascaded, iterative T-bus formations. The architecture of the invention thus lends itself to a simple, compact system.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
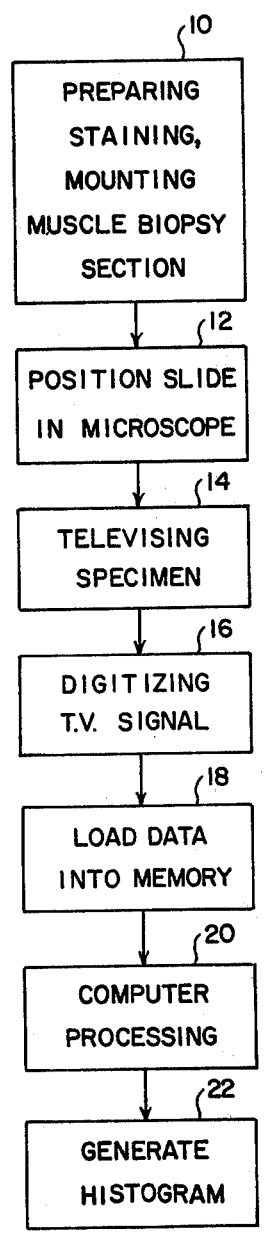
FIG. 1 is a schematic block diagram illustrating the method steps of the invention.

Attention is now directed to FIG. 1 wherein a first step 10 entails preparing, staining, and mounting a muscle biopsy section on a microscope slide. Once the biopsy section has been surgically obtained, it is then suitably prepared with a histochemical reaction, such as ATPase, whereby type 1 (slow) muscle fibers react weakly and appear light while, at the same time, type 2 (fast) muscle fibers react strongly and appear dark. It is this contrasting color differentiation utilizing histochemical techniques and resulting from the staining which makes it feasible for the invention to classify the type 1 and type 2 fibers. As stated above, the number of each type muscle fiber are roughly equal in a normal human being. In step 12, the microscope slide, upon which has been mounted the stained section of muscle tissue, is itself placed in the specimen plane of a standard commercially-available light microscope. A closed circuit television camera capable of transmitting in a black-and-white format is attached to the ocular of the microscope. Step 14 is accomplished by imaging the magnified stained biopsy section on the attached television camera in a transmission mode. The television system preserves the color differentiation between the dark (fast) fibers and the light (slow) fibers. The television camera video signal is transformed in step 16 to digital form by conventional analog-to-digital converter means. This produces a numerical representation of the specimen image consisting of a rectangular array of discrete "pixels" (or picture elements). Each pixel possesses a digital value representing the optical density or staining intensity of the corresponding point in the television image of the muscle tissue specimen. The data is loaded into the memory of a computer, at step 18. Afterwards, in step 20, the digital image of the biopsy section is processed by the computer; in this manner, the individual muscle fibers first are isolated. The area and average optical density of each fiber is measured. The fibers are then classified by their staining intensity (optical density). A fiber-size histogram for both types of fibers is next generated on a suitable graphics display terminal in step 22. The histogram curve reveals the number of fibers as a function of the fiber area measured in square microns. It may then be used as an aid to diagnosis or research.

Figure 2:
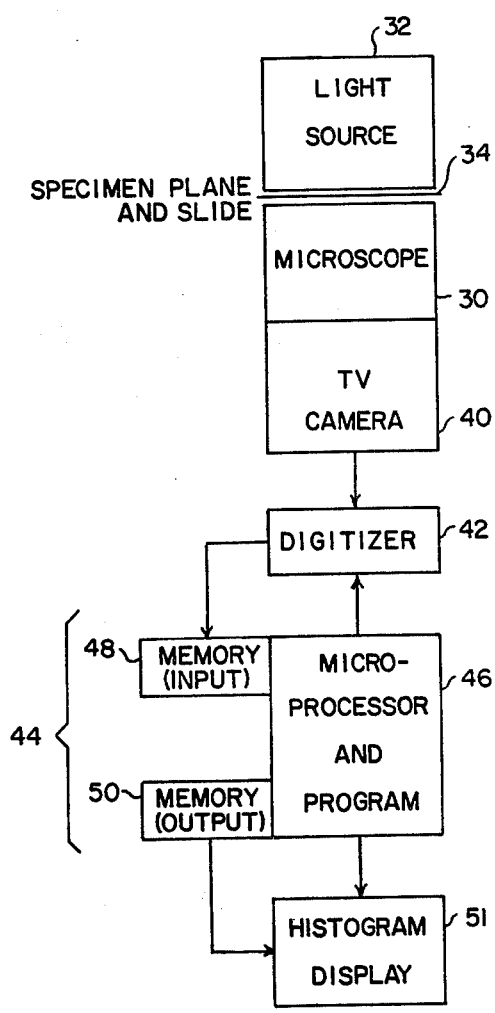
FIG. 2 is a block diagram illustrating the primary system functions of the invention.

FIG. 2 depicts a conventional microscope 30 having a light source 32 for illumination. In the specimen plane between microscope 30 and light 32 is positioned a slide 34 upon which a biopsy section of muscle tissue (not shown) is mounted. In the preferred embodiment, the biopsy specimen has been prepared using an ATPase reaction and then has been stained in order to distinguish between "fast" and "slow" type muscle fibers. A television camera 40, which is capable of transmitting a black-and-white magnified image of the stained biopsy section, attaches by appropriate means to the ocular of microscope 30 and scans an area of microscope slide 34. The televised black-and-white image 38 (FIG. 3a) of the muscle specimen is transmitted electronically to a digitizer unit 42. Digitizer 42 converts the analog signal output of television camera 40 into a plurality of discrete pixels (or picture elements), each having a digital value corresponding to the particular density of the corresponding point in the stained biopsy section. The digital values are then processed by a special-purpose digital computer 44 capable of isolating and classifying individual muscle fibers.

In the preferred embodiment, special-purpose computer 44 is designed and particularly adapted for use in a scientific, clinical environment by reason of a sequential programming, step-oriented pipeline architecture comprising an LSI microprocessor and program 46 and two memory units 48, 50. The digital values of the pixels are loaded into the memory 48 of computer 44. Depending upon the particular analysis required, a computer program, which is stored in a third memory (not shown), commands the microprocessor 46 to access and process the data stored in input memory 48.

The processing is designed to compute measurements of the number and area, as well as the density of each of the muscle fibers. Classification of each type of fiber according to average optical density is also accomplished by the processing step. At the end of the processing step, the total number of each type of muscle fiber having each discrete area value are outputed by the computer program to display fiber area histograms for each fiber type on a suitable output terminal 51.

This procedure provides digital analysis of video information which is not limited in what can be done, as opposed to prior art analog analysis, which is restricted to what can be done in real time. Here the system feeds the microscope image into the computer which then isolates and counts the fibers and measures their size. It then generates for display graphs (histograms) showing the size distribution for each type fiber. This information will assist physicians in diagnosing and treating muscle disease, and will facilitate research aimed at understanding human muscle disease processes, as discussed, for example, by V. Dubowitz and M. H. Brooke in *Muscle Biopsy, A Modern Approach*, W. B. Saunders Co., Ltd. (1973).

A brief review of the procedure will now be described with reference to FIGS. 3a, 3b and 3c, and discussed with reference to iterative microprocessing techniques. It should be understood, however, that the specific iterative microprocessing techniques are exemplary, and not in any limiting since those skilled in the art will know of other techniques which may be employed, such as those described by Azriel Rosenfeld and Avinash C. Kah in *Digital Picture Processing*, Academic Press (1976), and Richard O. Duda and Peter E. Hart in *Pattern Classification and Scene Analysis*, John Wiley & Son (1973).

Figures 3A, 3B:
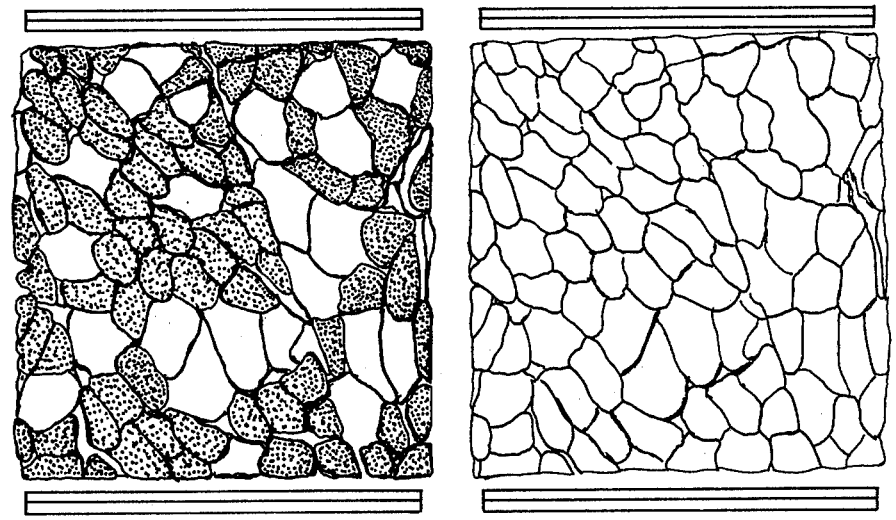
FIGS. 3a, 3b and 3c illustrate a microscopic image of a muscle biopsy section, a display of fiber boundaries for the muscle biopsy section and a histogram for the muscle biopsy section.
Figure 3C:
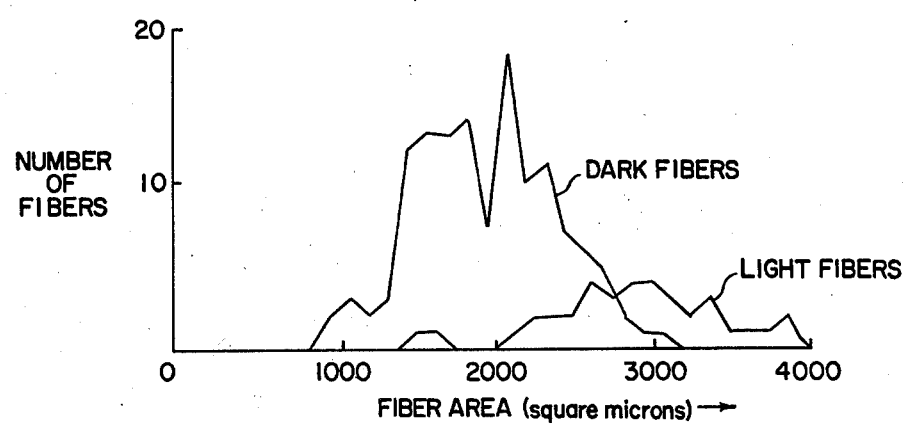

FIG. 3a is a microscope image of a muscle biopsy section as presented to the television camera. It is digitized and stored as discrete pixel values proportional to the optical density of corresponding points in the specimen. For simplicity, only two distinct densities are illustrated: one for type 1 (slow) fibers which appear light, and one for type 2 (fast) which appear dark (shaded), although in practice there will be some fibers which will appear between light and dark, but which may nevertheless be classifiable as one of the two types. (In some analysis, three types are classified, and in such analysis the techniques are simply expanded to accommodate the third type and ultimately generate a histogram for these types.) In the normal human, the number of each type fiber is roughly equal, with fiber diameter distributed around approximately 50 microns, although various neuromuscular diseases affect fiber size and the relative proportion of the types. In this example, both the fiber size and type is relatively normal.

Once the pixel data is loaded into memory, the boundaries of the fibers are determined. Then they are classified as to type, and as to size for each type, in order to display a histogram. FIG. 3b illustrates the fiber boundaries, and FIG. 3c illustrates a typical histogram. To determine the boundaries, the microprocessor scans the pixels systematically beginning, for example, at the upper left and proceeding row by row from top to bottom. For each pixel, beginning with the second one, a comparison is made between the values of the pixels before and after it in the horizontal direction, and beginning with the second row, between the values of the pixels above and below it. Any marked change of greater than some predetermined magnitude indicates a boundary. This technique of computing the mathematical gradient magnitude at each pixel is relatively simple and accurate for determining fiber image boundaries. An isolated muscle fiber image is then defined as a connected (adjacent) set (group) of pixels all having gradient magnitudes less than some preset threshold value. Each fiber thus isolated is assigned a unique number for reference purposes.

It would be feasible to determine all of the boundaries, and to display the boundaries as by FIG. 3b for a human operator to interactively correct since experience will enable the operator to determine where the microprocessor has likely failed to detect a boundary between fibers. It would also be feasible to program such review for automatic correction. That is accomplished by causing the program to start at a specified point inside a particular fiber and execute a region growing algorithm thereby sequentially expanding a boundary about the point until the border of the fiber is reached. This algorithm is relatively simple from an imaging process point of view because the fiber boundary about any point is convex. In either case, the next procedure would be to classify each bounded area as to type, and to classify it as to size for each type. The area measurement of a particular fiber is simply the number of pixels inside the boundary multiplied by the area, at the specimen plane, of a single pixel, while the optical density of the fiber is the average of the pixel values inside the boundary. Typing is accomplished by comparing the optical density of each fiber with a predetermined range of optical density for each type. At the same time, the number of fibers of each type and size are also counted, to complete the data required for a fiber size histogram. In that manner automatic quantitative analysis is provided to replace the usual prior art analysis which is quite subjective in its classification of fiber types and size, and is extremely tedious and subject to many errors due to operator fatigue.

From the foregoing it is seen that the major processing is that of isolating the areas. The gradient-based fiber isolation technique just described separates the fibers in the digitized image format very simply and with a high degree of accuracy. Before measuring the fibers as to density (type) and area (size) a shape analysis program may be employed to examine each fiber, and to separate those shapes corresponding to touching fibers where the isolation program has failed to properly isolate the fibers, or an operator examines the image of FIG. 3b and interactively separates touching fibers. Alternatively, both the isolation program and the human operator may be used to perfect isolation of the fibers.

Figure 4:
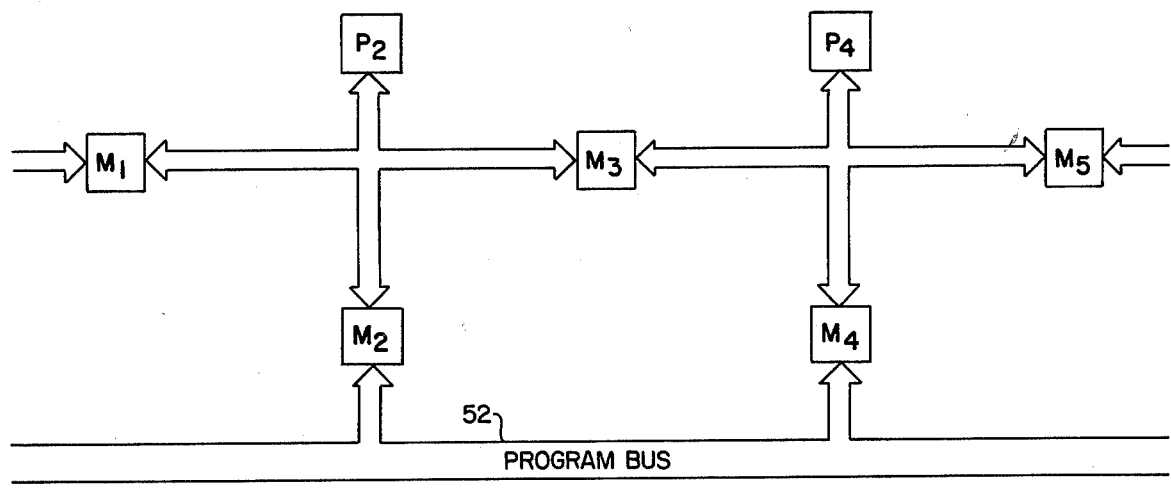
FIG. 4 is a block diagram showing the architecture of the multi-microprocessor computer used in the invention.

In FIG. 4, the preferred architectural arrangement for the computer 44 is illustrated as comprising a plurality of microprocessors $P_2$, $P_4$ . . . and a plurality of memory blocks $M_1$, $M_2$ . . . Each of the memory blocks is a two-port memory block; the capacity of each block holds 4096 eight-bit bytes. Each of the microprocessors may be a conventional microprocessor such as the MC6800 manufactured by Motorola and American Microsystem Inc. Processor $P_2$ is connected electronically with data memory blocks $M_1$, $M_3$ and also with a program memory block $M_2$; while processor $P_4$ is similarly connected to data memory blocks $M_3$, $M_5$ and to program memory block $M_4$. In operation, processor $P_2$ is controlled by a computer program stored in memory block $M_2$. Processor $P_2$ reads its program from memory block $M_2$, takes its input data from $M_1$, and stores its output data in $M_3$. Similarly, $P_4$ reads its instructions from a program stored in $M_4$, and its input data from $M_3$ and writes its output data into $M_5$. Each of the memory blocks is comprised of a commercially available integrated circuit memory chip, such as the 2012 memory chip manufactured by Intel Corporation.

The architecture depicted by FIG. 4 makes it possible for input data, such as the televised images of a muscle biopsy specimen, to be passed from left to right through various stages of processing. A program bus 52 has the capability of being used to load the required programs directly into the program memory blocks $M_2$ and $M_4$ before the processing begins. Due to the novel iterative arrangement of the components, it is necessary that each of the data memory blocks $M_1$, $M_2$, $M_3$, $M_4$, $M_5$ be designed to have two ports for access by two separate processors. Since the processors are required to share the memory blocks, memory access conflicts may arise and must be resolved. One exemplary way to do this is to have one of the two micro-processor units stop until the memory-sharing conflict is terminated using clock stretching techniques.

Figure 5:
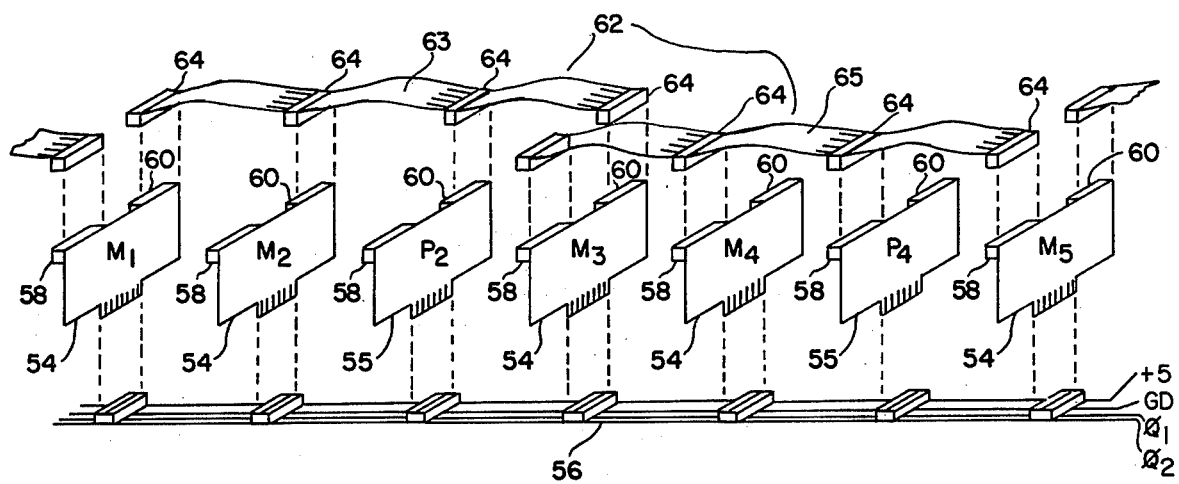
FIG. 5 is a perspective view showing the memory and interconnection of microprocessor modules of the computer in accordance with the diagram of FIG. 5.

FIG. 5 shows one embodiment of the preferred hardware configuration for the architecture illustrated in FIG. 4. Printed electronic circuit boards 54, 55 comprise two processors $P_2$, $P_4$ having clock stretching capabilities and five memory blocks $M_1$, $M_2$, $M_3$, $M_4$, $M_5$. The circuit boards are placed adjacent to each other and plugged into a power and clock bus 56. In the preferred embodiment, the boards are ordered in the following sequence: $M_{2i-1}$, $M_{2i}$, $P_{2i}$, . . . for i=1,2,3 . . . . . Bus 56 is implemented as back-plane wiring carrying five volts, a ground GD, and dual phase clock pulses $\Phi_1$, $\Phi_2$ on a conventional card rack (not shown). On top of each processor and memory card are located two connectors 58, 60 forming the two access ports required for communication between each iterative module. Each port is comprised of address, data and control lines. The communication is carried via ribbon cables 62 each having four connectors 64. For instance, a single strip of ribbon cable 63 can connect $P_2$ with $M_1$, $M_2$ and $M_3$; while, at the same time, a second strip of cable 65 can connect $P_4$ with $M_3$, $M_4$ and $M_5$. By using this arrangement of but two standard types of processor and memory printed circuit cards 54, 55 many different configurations are possible. For example, one need not be limited in the number of such memory cards 54 which can be utilized for either data or program memory blocks. The configuration depicted in FIG. 5 can easily be modified to reflect those changes by appropriately rewiring ribbon cables 62.

Figure 6:
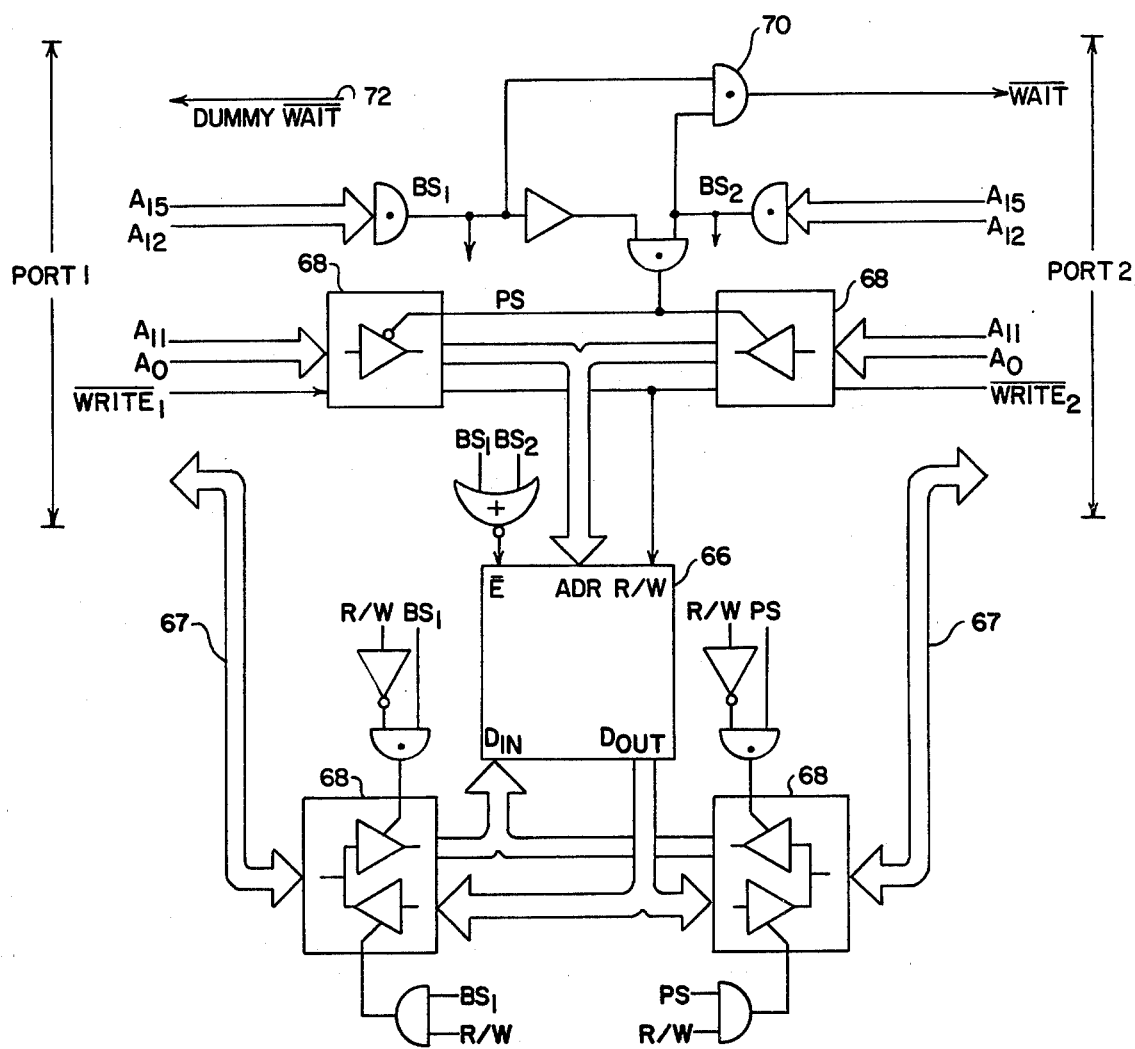
FIG. 6 is a logic circuit diagram for a single shared memory module.

Attention is now directed to FIG. 6 which illustrates the logic diagram for a typical two-port memory block module. The unbuffered solid state memory block 66 holds a capacity of 4096 bytes, each having eight bits, and is implemented with standard integrated circuit memory chips, such as the Intel 2102 referred to hereinbefore. In addition to a Read/Write (R/W) line and an active low $\overline{\text{ENABLE}}$ ($\overline{\text{E}}$) line, memory 66 has twelve bits of ADDRESS (ADR) input, eight bits of DATA IN ($D_{IN}$) and eight bits of DATA OUT ($D_{OUT}$). The circuit itself has two ports through which two separate processors can access memory 66. A first Port 1 is the high-priority port and a second Port 2 is assigned low priority. In each case, the lower order twelve bits of the ADDRESS ($A_{11}$–$A_0$) together with the eight-bit DATA bus 67 are routed to the memory chips in block 66 by suitable port select logic as shown. In the preferred embodiment, four groups of tri-state buffers 68 are employed, under logical control, to connect or disconnect the ADDRESS and DATA lines from each port to block 66.

The logic circuitry used to accomplish the actual port selection function is also shown in FIG. 6. When the most significant four bits ($A_{15}$–$A_{12}$) of the ADDRESS applied to Port 1 select this particular memory block 66 by specifying its assigned address, then a first block select signal ($BS_1$) goes high. Likewise, when the processor which is connected to Port 2 selects memory block 66, a second block select signal ($BS_2$) goes high. The memory is enabled only when either $BS_1$ or $BS_2$ goes high; otherwise, it is dormant. At any given time, a port select signal (PS) determines which of the two ports is actually connected to block 66. By default, Port 1 is assigned access to the memory block and, correspondingly, PS goes low. However, when $BS_2$ goes high and, at the same time, $BS_1$ is low to signify that only the processor connected to Port 2 has selected the memory block, PS goes high and the memory is awarded to Port 2. Should a memory access conflict arise, it is reflected by the fact that both $BS_1$ and $BS_2$ are high. In that instance the PORT SELECT (PS) line automatically awards the memory to Port 1. In addition, an active low $\overline{WAIT}$ signal is generated by the logic circuitry and sent to the processor connected to Port 2. This signal is generated by an open collector gate 70 so that $\overline{WAIT}$ lines from several memory blocks (not shown) can be wire-OR'ed and used at the same time. In the preferred embodiment, a dummy $\overline{WAIT}$ signal 72 is applied to Port 1, but it is at no time pulled low. Depending upon which port is selected, the Read/Write (R/W) input for memory 66 can be derived from the active low $\overline{WRITE}$ input. In turn, the routing of the bidirectional DATA bus from memory 66 to either Port 1 or Port 2 is controlled by the PORT SELECT (PS) line and the data direction by the Read/Write (R/W) lines.

Figure 7:
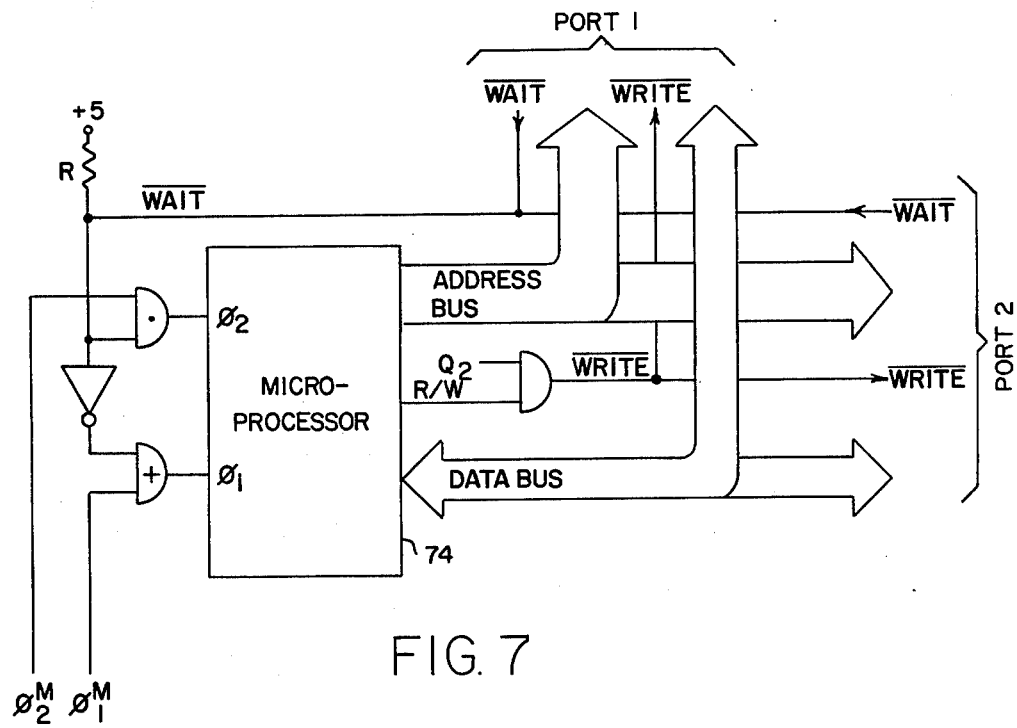
FIG. 7 is a logic diagram for a typical microprocessor module.

FIG. 7 diagrams a microprocessor (μP) 74 with two access ports Port 1 and Port 2 for memory and data bus connection. An active low $\overline{WAIT}$ input signal having the capability of stopping processor 74 by clockstretching is also shown. The Phase 1 ($\Phi_1$) and Phase 2 ($\Phi_2$) clock signals for microprocessor 74 are both derived from a master clock ($\Phi_1^M$, $\Phi_2^M$). As long as the $\overline{WAIT}$ signal is high, the master clock signal is propagated intact to the microprocessor. However, when the $\overline{WAIT}$ signal is pulled low, the microprocessor clock lines are, in effect, frozen with Phase 1 high and Phase 2 low. An active low $\overline{WRITE}$ signal is created as the product of a Read/Write (R/W) signal, which is generated by the microprocessor, and of the Phase 2 ($\Phi_2$) clock signal. In the preferred embodiment, Port 1 and Port 2 are implemented by dual connectors 58, 60 wired in parallel.

Figure 8:
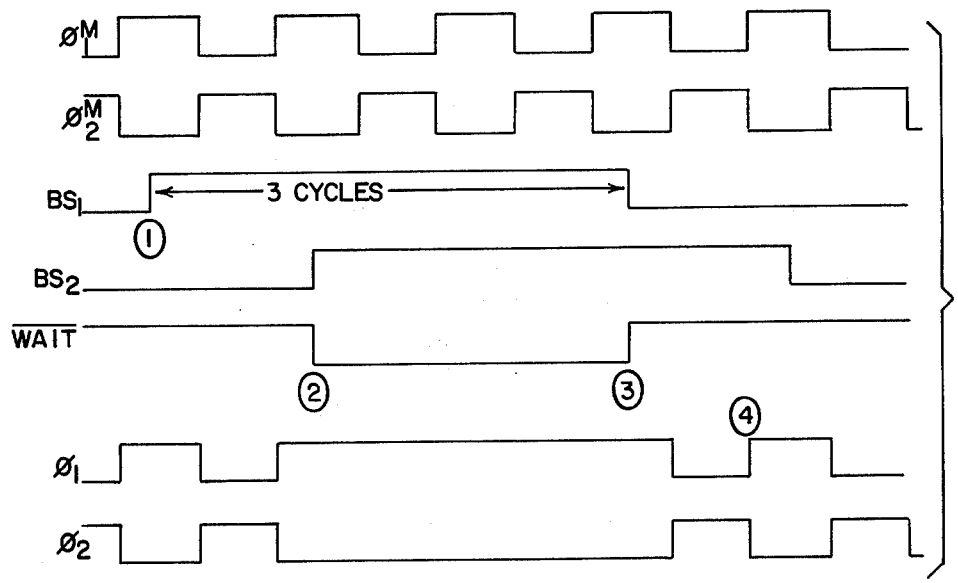
FIG. 8 is a diagram of the clock timing activity during a memory access conflict.

The clock timing for the shared memory port and microprocessor are shown in FIG. 8. At the top is a two-phase master clock having non-overlapping Phases 1 and 2 ($\Phi_1^M$, $\Phi_2^M$) alternatively going high. For purposes of illustration, one may assume that block select signal $BS_1$ goes high at point 1, thereby indicating that a first processor is using the memory via its port number 1. At point 2, a second block select signal $BS_2$ goes high to indicate that a second processor is attempting to use the memory via its port number 2. Since both $BS_1$ and $BS_2$ are high, a memory-access conflict has occurred and the $\overline{WAIT}$ signal goes low (active). During the period from point 2 to point 3 the memory is awarded to the first processor and at the same time, the clock signal to the second processor is frozen with Phase 1 ($\Phi_1$) high and Phase 2 ($\Phi_2$) low. The second processor is thus effectively stopped temporarily. At point 3, the first processor accesses a memory location outside the memory block 66, thus terminating the conflict. In that manner $BS_1$ goes low after being active for, in this case, three cycles. At that moment, the $\overline{WAIT}$ signal is caused to go high (inactive) and access to the memory is awarded to the second processor. During the period from point 3 to point 4, the second processor completes its extended clock cycle. The net result of the timing sequence depicted in FIG. 8 is that when two microprocessors attempt to access the same memory, the $\overline{WAIT}$ line goes low, in turn freezing the second processor in Phase 1 ($\Phi_1$) of its clock cycle. The second processor is thereby stopped until the first processor finishes accessing the memory. As soon as the memory access conflict terminates, the second processor is allowed to continue its operation in phase with the master clock.

When the microcomputer system is started up, all processors are in the RESET condition. They remain idle while an external computer loads the required programs into the appropriate Read/Write program memory blocks. If some or all of the program memory blocks are Read only memory, they need not be loaded. Next the operator removes the reset condition and each processor begins checking a specified status control word location in its input data memory block. The first processor, however, begins immediately reading input data from some image data source such as an image digitizer. When it completes the processing of the first image it writes a pre-arranged status code into its output data memory block which is the input data memory block of the next processor. When the second processor detects this status code it begins processing the image. This process continues with the processors communicating their status via control words in the shared memory blocks. When a particular processor finishes one image it executes an idle loop checking its status code word, waiting for the signal that another image is ready for processing.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. A method for automatic biopsy analysis of a muscle tissue specimen mounted upon a microscope slide, said tissue specimen being stained to produce a histochemical reaction of varying degrees of intensity distinguishing at least first and second types of muscle fibers, said reaction causing said first type muscle fiber to appear dark and said second type muscle fiber to appear light, said method comprising steps of
   positioning said stained microscope slide in the specimen plane of a microscope,
   using said microscope to obtain a magnified image of said muscle tissue specimen, digitizing discrete points of raster scans of said image to produce digital data, each of said points comprising a pixel having a digital value representing image light intensity, processing said pixels to determine area boundaries of fibers, using said pixels to compute size and average density of each of said muscle fibers by counting the number of pixels in a boundary area while accumulating pixel values for each boundary in order to determine both size and average density, classifying said muscle fibers into two or more types based upon their measured size and average density characteristics, and generating a graphical display of fiber characteristics showing the distribution of fiber sizes for each of several fiber types.

2. In apparatus for automatic biopsy analysis of a muscle tissue specimen, said muscle tissue having a plurality of muscle fiber types, said fibers being of known sizes and densities, said tissue specimen being stained to produce a histochemical reaction of varying degrees of intensity distinguishing said types of muscle fibers, said tissue specimen further being mounted upon a slide, the combination comprising:

means for positioning said stained microscope slide in a specimen plane of a microscope, said microscope having a television camera attached thereto, means for televising an image of said microscope slide, said image produced by scanning with said camera a magnified area of said muscle tissue specimen, means for digitizing said televised image to produce digital data, said data represented by a plurality of discrete pixels, each of said pixels having a digital value representing a physical characteristic of said televised image, means for processing said pixels to determine area boundaries of fibers, means for accumulating said digital values while counting pixels in each separate fiber area to ascertain sizes and densities for each of said muscle fibers, means for classifying said fiber areas into two or more of said plurality of fiber types based upon their measured size and average density characteristics, and means for generating a graphical display of size distribution of each fiber type as a fiber histogram.

3. The combination described in claim 2, wherein said means for computing comprises at least two computing modules, said modules being coupled to each other in a cascaded iterative T-bus formation.

4. The combination described in claim 3, wherein each computing module comprises a microprocessor unit a read/only or read/write memory wired electronically to said microprocessor, said read/only memory containing a plurality of stored program instructions controlling said microprocessor, and a read/write memory wired electronically to said microprocessor, said read/write memory providing storage data input and output for said microprocessor, said output constituting input for a second computing module.

5. The combination described in claim 4, wherein each computing module further comprises means responsive to said microprocessor unit for resolving a potential memory-sharing conflict between said computing modules arising when both computing modules attempt to access said memory simultaneously.

6. An apparatus as described in claim 5, wherein each computing module has a first port to said memory and a second port to said memory, said resolving means comprising a first and second block select signal transmitted to said memory from said first and second ports respectively, said first block select signal going high when said first computing module attempts to access the memory, said second block select signal going high when said second computing module attempts to access the memory;

a port select signal determining which of said ports is connected to said read/write memory, said port select signal going low and awarding memory access to said first computing module when said first block select signal is high or said second block select signal simultaneously is low, said port select signal going high and awarding memory access to said second computing module when said second block select signal is high and said first block select signal simultaneously is low.

7. An automated system using a programmed computer to aid the diagnosis of neuromuscular diseases by producing fiber size histograms utilizing histochemically stained muscle biopsy tissue on a slide mounted in a microscope to present an image of stained muscle fiber to the optics of said microscope, comprising means for scanning said image to obtain a video signal indicative of the darkness of each point scanned, means for converting said video signal to digital form for storage for subsequent processing, memory means for storing said video signal in digital form, a programmed microprocessor for isolating individual muscle fibers, simultaneously measuring the size and average density of fibers isolated, and classifying the fibers as to size and density to produce size distribution data for predetermined classes of density, and means under control of said programmed microprocessor for plotting a histogram of the muscle biopsy tissue as to the number of fibers of different sizes of each predetermined density class.

8. An automated system as defined in claim 7 wherein said plotting means includes a memory for storing the output of said programmed microprocessor for access while plotting, and said programmed microprocessor includes a plurality of processors and memories, each processor coupled to one other processor in cascade through a unique memory having two ports for access thereto by two processors, whereby sequential programmed, step-oriented pipeline architecture accommodates procedures necessary to perform the programmed microprocessor functions.

9. An automated system as defined in claim 8 wherein each processor having access to two shared memories is provided with a third memory for storing a program for that processor to carry out its function in cooperation with processors with which there is communication through shared memories.

10. An automated system as defined in claim 9 wherein each processor is further provided with a first port channeling data out to storage and a second port channeling data in from storage, and means for resolving a potential memory-sharing conflict between processors arising when two processors address a shared memory for access thereto at the same time comprising a first and second block select signal transmitted to said memory from said first and second ports respectively, said first block select signal going high when said first computing module attempts to access the memory, said second block select signal going high when said second computing module attempts to access the memory;

a port select signal determining which of said ports is connected to said read/write memory, said port select signal going low and awarding memory access to said first computing module when said first block select signal is high or said second block select signal simultaneously is low, said port select signal going high and awarding memory access to said second computing module when said second block select signal is high and said first block select signal simultaneously is low.